United States Patent [19]
Hing

[11] 3,762,708
[45] Oct. 2, 1973

[54] TETHERED BALL DISCOUNT DETERMINING APPARATUS

[76] Inventor: Ally Ong Hing, 1245 E. Prince Rd., Tucson, Ariz. 85719

[22] Filed: Mar. 1, 1972

[21] Appl. No.: 230,707

[52] U.S. Cl.............. 273/98, 273/95 A, 273/105 R
[51] Int. Cl............................................. A63b 72/00
[58] Field of Search................. 273/95 R, 95 A, 98, 273/102 R, 106 R, 101, 105 R

[56] References Cited
UNITED STATES PATENTS

| 507,098 | 10/1893 | Bates | 273/105 R |
| 1,781,717 | 11/1930 | Bradt | 273/98 |
| 1,684,602 | 9/1928 | Spitzer | 273/98 |
| 3,480,280 | 11/1969 | Gamertsfelder | 273/106 R |

*Primary Examiner*—Richard C. Pinkham
*Assistant Examiner*—Marvin Siskind
*Attorney*—Eric P. Schellin et al.

[57] ABSTRACT

This specification discloses apparatus for determining the discount which may be granted to a customer in a retail establishment, such as a food store, with the quantity and amount of the discount being determined by the skill of the customer in delivering a missile to a target board. The apparatus includes as a characteristic and essential element a checkout counter. The customer stands on one side of the counter and the target board is located on the opposite side.

2 Claims, 10 Drawing Figures

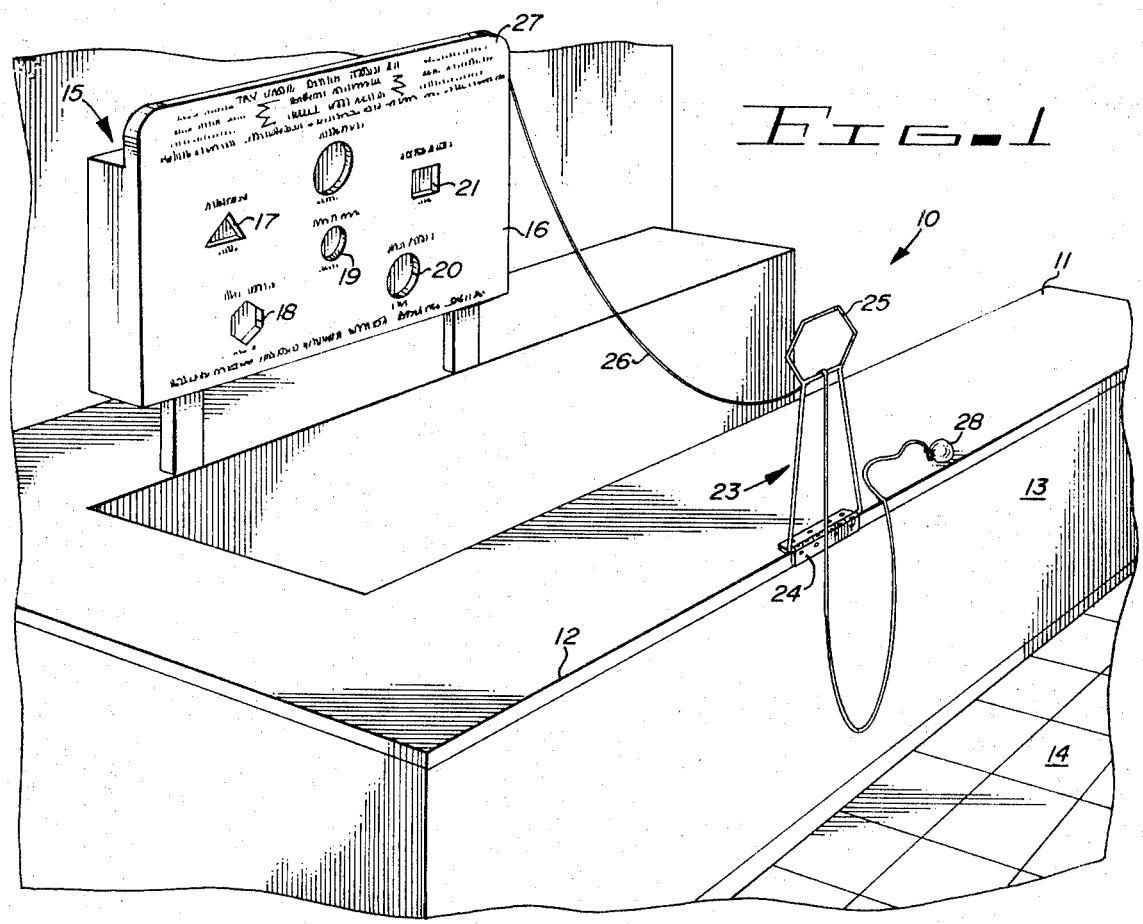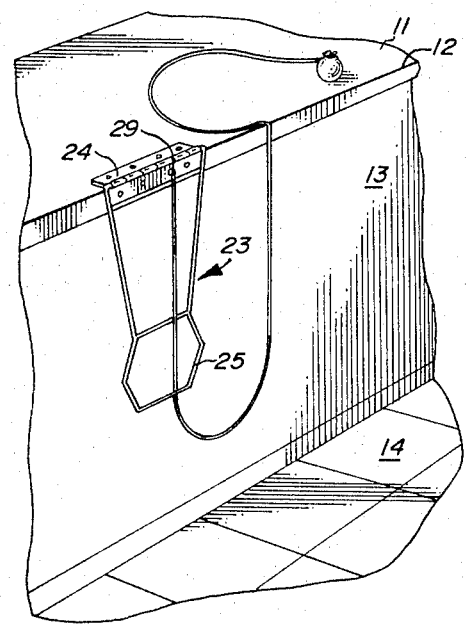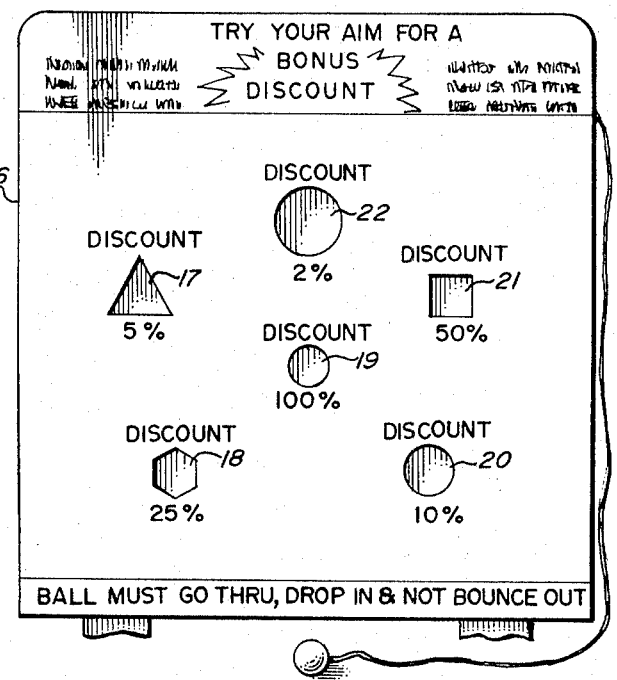

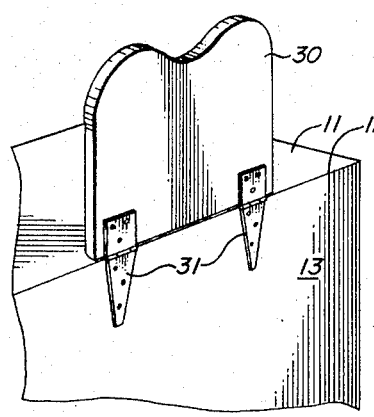 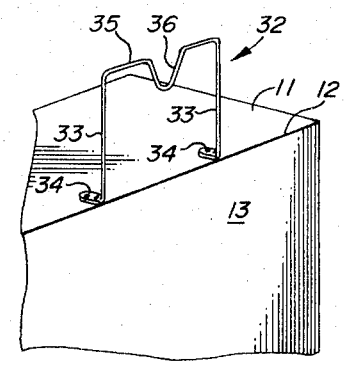 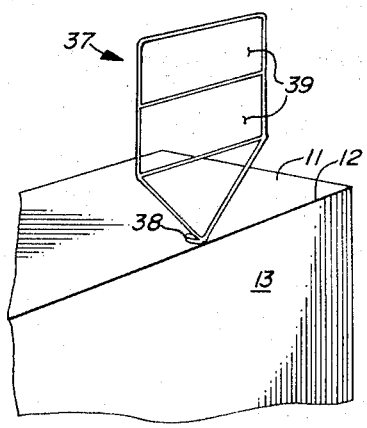
FIG.4a    FIG.4b    FIG.4c
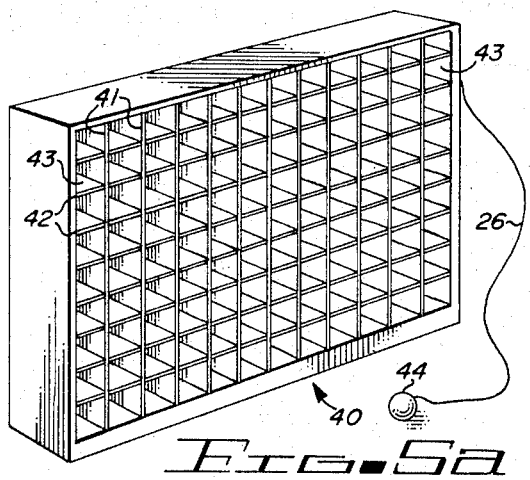 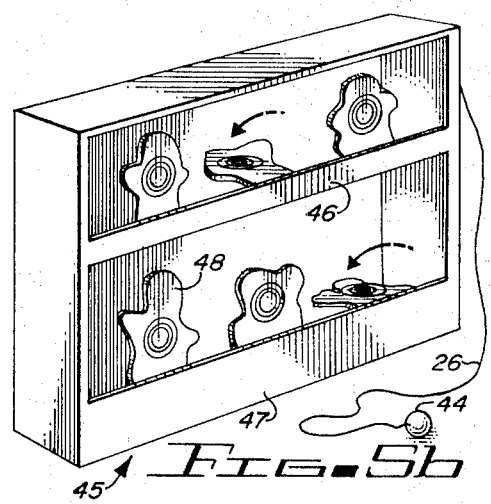
FIG.5a    FIG.5b
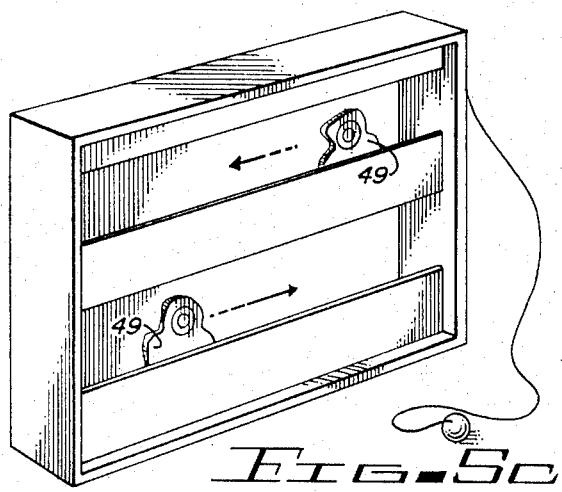 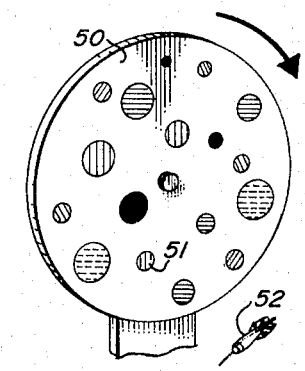
FIG.5c    FIG.5d

3,762,708

TETHERED BALL DISCOUNT DETERMINING APPARATUS

The present invention relates to apparatus for determining the discount to be accorded to a customer in a retail store and is concerned primarily with apparatus which involves the skill of the customer to determine the amount or percentage of discount to which he is to be entitled on any particular transaction.

BACKGROUND OF THE INVENTION

At the present time, a large number of retail establishments, and particularly food stores, include a checkout counter on which the items selected by a customer are deposited, the prices totalled, the goods collected, and from which they are taken from the store.

The retail food industry is now discount conscious. Many food chains now extensively advertize their discount prices. Coupons are used in promoting sales. Such coupons ordinarily entitle the customer to a discount. Trading stamps are also being widely used for promoting sales and these stamps are usually a form of discount. Some retail stores now use chance devices in determining the amount or precentage of a discount for a particular sale. However, there is no known device or apparatus which is tied in with a checkout counter and which apparatus involves the skill of a customer in determining the amount of a discount to be granted to him.

There are now many games which are used or played by the player throwing, or otherwise delivering, a missile to a target and the successful playing of which depends on the skill of the player. The target, or target board, includes areas of different sizes and/or shapes which are struck by the missiles with varying degrees of difficulty.

OBJECTS OF THE INVENTION

With the foregoing conditions in mind, the present invention has in view the following objectives:

1. To provide a discount determining apparatus which includes as essential elements a checkout counter which receives goods that are purchased by a customer who ordinarily stands on one side of the counter, a target board on the opposite side of the counter, and a missile which is thrown or otherwise delivered to the target board by the customer.

2. To provide, in apparatus of the type noted, a device which is mounted on the counter and which determines the position of a customer in the delivery of the missile to the target board.

3. To provide, in apparatus of the character provided, a target board including individual areas or objects which are engaged by a missile with varying degrees of difficulty and to which different discount values attach.

4. To provide, in apparatus of the kind described, a target board, a tether having one end anchored to the board, and a missile secured to the other end of the tether.

Various other more detailed objects and advantages of the invention such as arise in connection with carrying out the above ideas in a practical embodiment will, in part, become apparent and, in part, be hereafter stated as the description of the invention proceeds.

SUMMARY OF THE INVENTION

The foregoing objects are achieved by providing a checkout counter such as is ordinarily present in a retail food store with a target board on the side thereof remote from the side which is occupied by a customer. This target board has areas or objects to which various discount values attach. On the customer side of the counter is a device which locates the customer in a position from which a missile is delivered to the target board. In one embodiment, a tether has one end anchored to the target board and its other end to the missile. The tether passes through the customer locating device.

For a full and more complete understanding of the invention, reference may be had to the following description and the accompanying drawings wherein:

FIG. 1 is a perspective view of apparatus embodying the precepts of the present invention;

FIG. 2 is a detailed perspective depicting the customer locating device in a position of non-use;

FIG. 3 is a front elevation of one target board which may be used;

FIG. 4a is a detailed perspective of a modified form of the customer locating device;

FIG. 4b is a detailed perspective of another modification of the customer locating device;

FIG. 4c is a detailed perspective of still another modification of the customer locating device;

FIG. 5a is a perspective of a modified target board;

FIG. 5b is a perspective of a modified target;

FIG. 5c is a perspective of another modified target, and

FIG. 5d is a perspective of still another modification of a target.

Referring now to the drawings, and first more particularly to FIG. 1, a checkout counter is identified in its entirety at 10. It will be understood that checkout counters vary in shape and design with different store installations. However, they all have certain common features. Thus, counter 10 includes a horizontal surface 11 on which items selected by the customer are deposited. Surface 11 terminates at one side at an outer edge 12 from which a wall surface 13 extends to floor 14. An inner edge 9 spaced from edge 12 is defined by surface 11. A store attendant ordinarily stands along this inner edge 9.

A cash register (not illustrated) is ordinarily mounted at a convenient location on, or with respect to counter 10. Mounted on counter 10 at a distance remote from the inner edge 9 is a target board referred to generally as 15. The target board includes a front panel 16 formed with openings 17, 18, 19, 20, 21 and 22. As shown more clearly in FIG. 3 opening 22 is a large circle to which the minimal discount value of 2 percent attaches. Opening 17 is a fairly large triangle and is for a 5 percent discount. Opening 20 is a circle smaller than opening 22 and has a discount value of 10 percent. Opening 18 is a small hexagon with a discount value of 25 percent. Opening 21 is a small square having a discount value of 50 percent and opening 19 is a small circle having a total discount value of 100 percent.

It will be understood that the above described arrangement, sizes, and shapes of openings 19 through 22 are purely exemplary and are not to be taken as a limitation on the invention as any of an almost infinite number of such arrangements may be employed.

A customer locating device is identified in its entirety at 23. It comprises a wire frame that is hinged to counter 10 at 24 and presents a loop 25. Under normal condition of non-use it is folded into a lower position, engaging wall 13 as depicted in FIG. 3. When in use, it is erected into the position of FIG. 1.

A tether 26 has one end anchored to board 15 at 27 as shown in FIG. 1. Attached to the other end of tether 26 is a missile 28 which may take any of several forms. Thus, it may be a resilient ball or a bag filled with shot, which is the type illustrated.

In using the apparatus of FIGS. 1, 2 and 3, the customer will occupy the side of counter 10 at edge 12. After the total price of the items being purchased has been determined, frame 23 is elevated into the position of FIG. 1 and bag 28, together with tether 26 is passed through loop 25. The customer will naturally assume a position at frame 23. Bag 28 is now grasped and the customer hurls it at target board 15 aiming at one of the openings 17 through 22. If the missile passes through one of these openings, that opening determines the percentage of the total value to be discounted. If all openings are missed, the customer receives no discount. Ordinarily, the customer is allowed only one throw, although this rule may be altered if the store owner so desires.

Modifications

FIG. 2 illustrates a slight modification in the point of anchorage of one end of the tether 26. In this embodiment, it is secured at 29 to the hinge, rather than to the target board 15.

In FIG. 4a a modified form of the customer locating device is illustrated. A panel 30 is connected to the counter at edge 12 by hinges 31. When not in use panel 30 is swung downwardly against wall 13. When a customer is to deliver a missile of any character, panel 30 is elevated into the erected position shown and the customer stands at the panel in delivering the missile.

FIG. 4b illustrates a customer locating device which is in the nature of a gun rest. Thus a wire frame 32 has legs 33 terminating in feet 34 which are secured to surface 11 of counter 10 at the edge 12. This may be achieved in any conventional way such as by screws. Frame 23 includes a top horizontal bar 35 formed with a central depression or notch 36. When the frame 32 is used an air gun such as one commonly known as a "pop-gun" is placed in notch 36. This gun will fire a missile such as a cork at the target board.

FIG. 4c illustrates a customer locating device in the from of a rack 37 which is mounted on surface 11 at edge 12 by a foot 38. Rack 37 presents two oblong openings 39 through either of which a tether comparable to tether 26 may be passed in establishing the condition for a customer to deliver a missile to the target board.

FIG. 5a illustrates another type of target board which may be used. Thus a rectangular box 40 has top, bottom and side walls with vertical dividers 41 extending between the top and bottom walls and horizontal dividers 42 between the side walls. These dividers together with the walls define compartments 43 any of which is adapted to receive a missile such as a ball 44 which is secured to one end of a tether 26. Each compartment 43 will have a discount value with those more closely adjacent to the walls having a greater discount value as a preferred arrangement.

In FIG. 5b a target board takes the form of a box 45 having front panels 46 and 47 with target figures 48 hingedly connected to the upper edges of the respective panels. A ball 44 is secured to box 45 by a tether 26. In use, a customer throws the ball 44 in an attempt to knock down one of the figures 48. Various discount percentages attach to the several figures 48.

FIG. 5c illustrates a target board similar to that of FIG. 5b with the notable exception that the target figures 49 are moved along horizontal paths by mechanism that is not illustrated because target devices of this type are well known.

In FIG. 5d there is illustrated a target board in the form of a rotating disc 50. The mechanism for rotating disc 50 is not illustrated because such mechanism is well known. The front face of disc 50 displays plurality of circular areas 51 of different sizes and which may be of various colors. Disc 50 constitutes a dart board against which a dart 52 is cast by a customer when in the proper position as determined by a customer locating device such as the panel 30 of FIG. 4a.

It will be understood that the target board of FIGS. 3, 5a, 5b, 5c and 5d are merely exemplary of target boards which may be used. Moreover, other types of apparatus involving the skill of the user may be employed to determine the discount percentage. Thus, games of the horseshoe or quoit type maybe utilized. Such games ordinarily include a peg and horseshoes or rings which are pitched or cast. Also apparatus of the coin pitching type in which a coin is pitched at a receptable such as a bowl may be found to be useful. However, in all such cases, the customer is located at a proper position relative to a checkout counter and the peg or receptacle is located on the opposite side of the counter. may be While preferred specific embodiments are herein disclosed, it is to be clearly understood that the invention is not to be limited to the exact apparatus, constructions and devices illustrated and described because various modifications of these details may be provided in putting the invention into practice.

I claim:

1. In apparatus for determining a discount which is to be given to a customer in a retail store,
   a. a checkout counter including a horizontal surface on which goods which are purchased are deposited and which surface terminates on one side at an outer edge along which a customer passes as a sales transaction is completed and an inner edge spaced from said outer edge and at which a store attendant stands,
   b. a target board associated with said counter and located at a distance remote from said inner edge with the horizontal surface being spaced from the target board,
   c. said target board including areas to which various discount values attach,
   d. a missile which is thrown at said target board by a customer while aiming at one of said areas and while occupying a position along said outer edge, and
   e. a customer locating device hingedly mounted on said counter at said outer edge thereof.

2. The apparatus of claim 1 in which said customer locating device is formed with a pair of openings together with a tether which is selectively passed through one of said openings and to one end of which said missile is secured with the other end of the tether being fixed.

* * * * *